United States Patent [19]

Kameoka

[11] 4,422,688
[45] Dec. 27, 1983

[54] LATCHING DEVICE FOR A DETACHABLY ATTACHABLE ROOF PANEL IN A VEHICLE

[75] Inventor: Michitada Kameoka, Musashino, Japan

[73] Assignee: Honda Giken Kogyo Kabushiki Kaisha, Tokyo, Japan

[21] Appl. No.: 300,635

[22] Filed: Sep. 9, 1981

[30] Foreign Application Priority Data

Sep. 9, 1980 [JP] Japan .......................... 55-128202[U]
Sep. 9, 1980 [JP] Japan .......................... 55-128203[U]
Sep. 9, 1980 [JP] Japan .......................... 55-128205[U]

[51] Int. Cl.³ .............................................. B60J 7/18
[52] U.S. Cl. .................................... 296/224; 16/229; 49/397; 292/DIG. 5
[58] Field of Search ................. 296/224; 49/465, 397; 16/181, 183, 163; 292/DIG. 5

[56] References Cited

U.S. PATENT DOCUMENTS 4,154,474 5/1979 Hough et al. ...................... 296/224
4,231,609 11/1980 Sorensen ............................. 296/224

FOREIGN PATENT DOCUMENTS 55-10408 3/1980 Japan .

*Primary Examiner*—Richard A. Bertsch
*Attorney, Agent, or Firm*—Polster, Polster & Lucchesi

[57] ABSTRACT

A latching device for a detachably attachable type roof panel in a vehicle constructed with a roof of the vehicle having an opening formed in one part thereof, the opening of which has an inner peripheral brim; a roof panel of a size to be snugly fitted in the opening of the roof in a detachably attachable manner; a detachably attachable hinge member provided on the front edge of the roof panel and which is engaged with the inner peripheral brim of the roof opening; a toggle latch provided on the rear edge of the roof panel to be also engaged with the inner peripheral brim of the roof; a pivotal shaft for connecting one of link members of the toggle latch and the roof being inserted and withdrawn by the expanding and contracting operations of a connecting shaft for the links through the links, and the pivotal shaft being maintained in its fitted state by a spring provided on the connecting shaft; and a locking mechanism which inhibits contraction of the expanding and contracting connecting shaft and is capable of being released when the roof panel is to be removed from the roof opening, the locking mechanism of which is provided on the toggle latch.

5 Claims, 14 Drawing Figures

LATCHING DEVICE FOR A DETACHABLY ATTACHABLE ROOF PANEL IN A VEHICLE

BACKGROUND OF THE INVENTION (a) Field of the Invention

This invention relates to a roof component for a vehicle having a detachably attachable roof panel to be fitted in an opening formed in one part of the roof component. More particularly, the invention is concerned with a latching device for joining the abovementioned detachably attachable roof panel with the opening portion of the roof component in the vehicle, thereby attempting to prevent disjointure of a pivot shaft due to unexpected shrinkage of a link connecting shaft and to secure mounting and dismounting of the roof panel by release of the latch with both hands.

(b) Description of Prior Arts

It has already been known that, in automobiles and other vehicles with roof, an opening portion is formed in one part of the vehicle roof for ventilating and lighting of the vehicle cabin, and the opening portion is covered with a detachably attachable roof panel. And, this detachably attachable roof panel, besides its detaching from, and attaching to, the roof opening, possesses a hinge function at its engaging part between the front edge of the roof panel and the inner peripheral brim of the roof opening with a view to raising its rear edge to a certain definite height to form a ventilating slit therebetween.

Explaining this structure in more detail, in reference to FIG. 1 of the accompanying drawing, a tongue-shaped hinge member 4 is projectively provided on the front edge 32 of the detachably attachable roof panel 3, and this hinge member is inserted into a groove of a hinge receiving member 5 provided at a position opposite to the hinge member to be engaged with it, while the rear edge 31 of the roof panel 3 is joined with the inner peripheral brim 21 of the roof opening by a toggle type latch 6.

The toggle type latch 6 is mounted at its one link 61 on the detachably attachable roof panel 3 through a pivot shaft 7, and, at its other link 62 on the roof component 1 through a pivot shaft 8. An operating handle 611 is integrally formed on the link 61 which is connected with the abovementioned detachably attachalbe roof panel 3.

The connecting link 62 with the roof component 1 is provided in pair at both left and right sides of the peripheral edge of the roof opening, and is connected with the other link 61 with a common doubly telescoping shaft 9 so that the roof panel may oscillate integrally at both left and right sides.

The connecting shaft 9 common to the links 61, 62 can be extended telescopically and contracted, and is maintained in a fitted state to a bearing 11 at the roof side of the pivot shaft 8 of the link 62.

When the above-mentioned link connecting shaft 9 is contracted against the spring 10, the pivot shaft 8 integral with the link 62 is pulled off the bearing 11 through the link 62, whereby the roof panel 3 can be removed from the roof opening as shown in FIG. 1.

This type of latching device, however, has conventionally been subjected to exposure to outside such that a spring to maintain the slip-fitting condition of the pivot shaft 8 to the bearing 10 is wound around the connecting shaft 9, and others. Such exposed arrangement of the spring might cause various troubles such that it may have fingers or foreign materials bitten therein when they are in touch with the spring, or gets rusted, or apprehensively gets off its place. Moreover, it spoils the outer appearance of the device and reduced its value as commodity.

SUMMARY OF THE INVENTION

The present invention aims at providing the above-mentioned toggle type latch with a locking mechanism which, in ordinary case, hinders contraction of the connecting shaft, and is capable of being released when the roof panel is to be removed.

It is the primary object of the present invention to provide the toggle latch device, from which the afore-described defects in the conventional latch device have been removed, and in which a spring is incorporated within an expanding and contracting connecting shaft.

It is the secondary object of the present invention to provide the toggle latch device which can be easily operated, without causing disengagement of the roof panel, for its opening and closing to obtain a lighting slit S.

According to the present invention, in general aspect thereof, there is provided a latching device for a detachably attachable type roof panel in a vehicle, comprising: a roof of the vehicle having an opening formed in one part thereof, the opening having an inner peripheral brim; a roof panel of a size to be snugly fitted in the opening of the roof in a detachably attachable manner; a detachably attachable hinge member provided on the front edge of said roof panel and which is engaged with the inner peripheral brim of the roof opening; a toggle latch provided on the rear edge of the roof panel to be also engaged with the inner peripheral brim of the roof; and a pivotal shaft for connecting one of link members of the toggle latch and the roof being inserted and withdrawn by the expanding and contracting operations of a connecting shaft for the links through the links, and the pivotal shaft being maintained in its fitted state by a spring provided on the connecting shaft, wherein improvement comprises a locking mechanism which usually prohibits contraction of the expanding and contracting connecting shaft and is capable of being released when the roof panel is to be removed from the roof opening, the locking mechanism being provided on the toggle latch.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which the disclosure is based may readily be utilized as a basis for the designing of other structures for carrying out the several purposes of the present invention. It is important, therefore, that the claims be regarded as including such equivalent construction so far as they do not depart from the spirit and scope of the present invention.

BRIEF DESCRIPTION OF THE ACCOMPANYING DRAWING

Specific embodiments of the present invention have been chosen for the purpose of illustration and description, and are shown in the accompanying drawing, forming a part of the specification, in which.

DETAILED DESCRIPTION OF PREFERRED EMBODIMENTS

In the following, the locking mechanism of the present invention will be described in detail with reference to its concrete construction of preferred embodiments thereof shown in the accompanying drawing.

Figure 1:
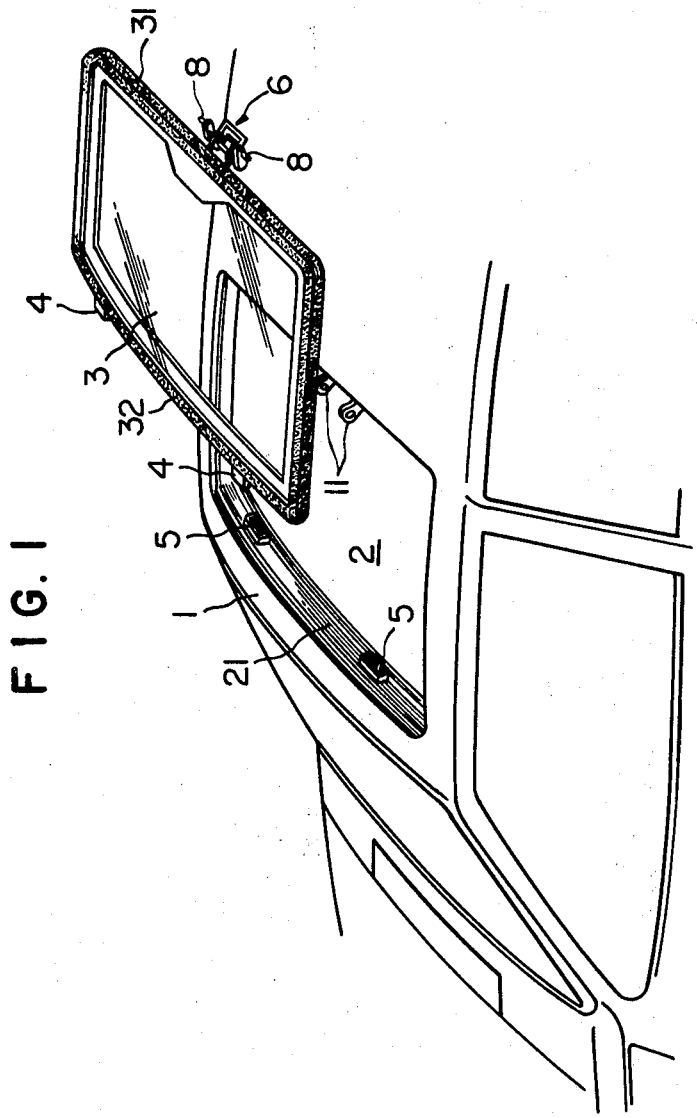
FIG. 1 is a perspective view of a roof of an automobile showing a state, in which the detachably attachable roof panel has been removed from an opening of the automobile roof.
Figure 2:
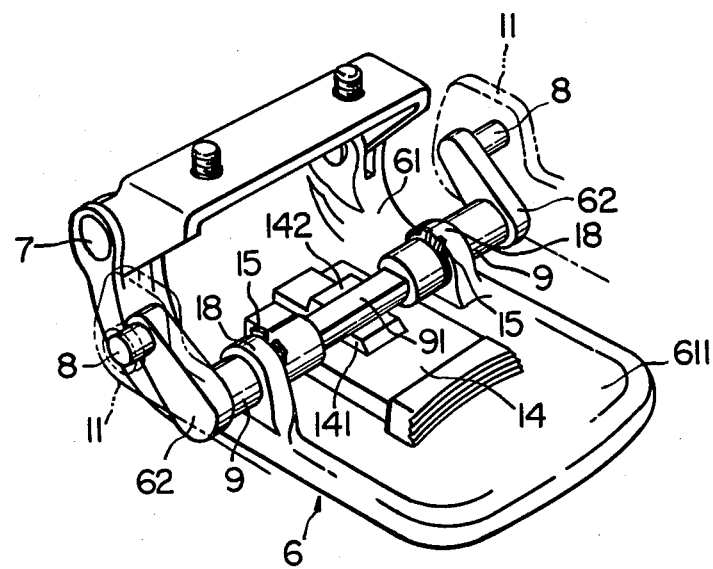
FIG. 2 is a perspective view of a toggle type latch.
Figure 3:
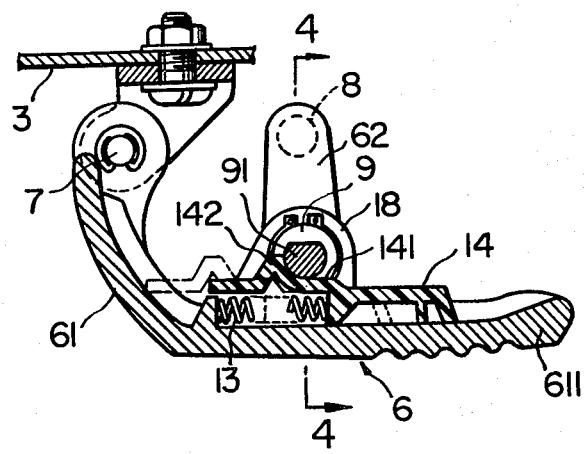
FIG. 3 is a longitudinal cross-sectional view of the latch shown in FIG. 2 taken along the center thereof.
Figure 4:
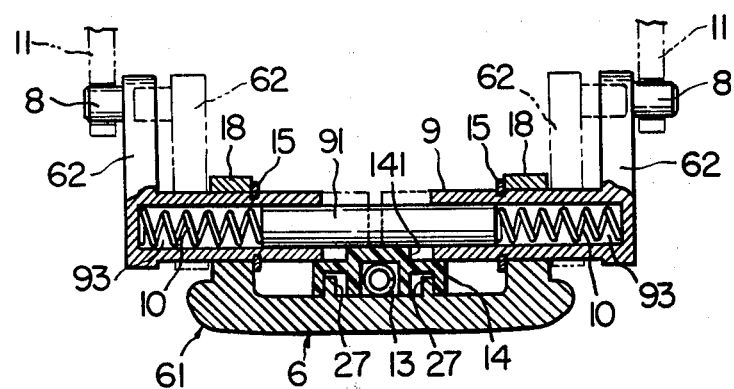
FIG. 4 is a cross-sectional front view of the latch taken along a line 4—4 in FIG. 3.
Figure 5:
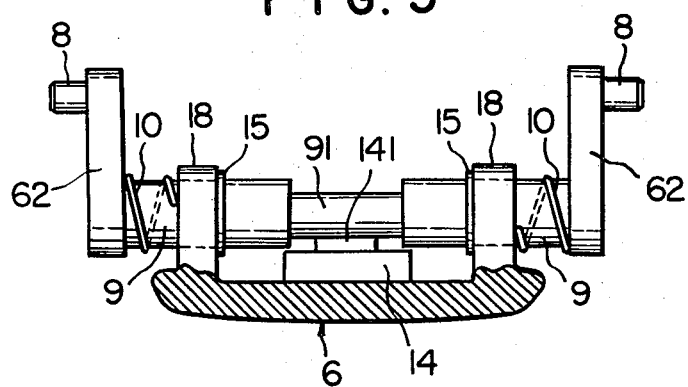
FIG. 5 is a frontal view, partly cut away, of another embodiment of the toggle latch, wherein the position of the spring is different from the former.

The preferred embodiment of the latch device as shown in FIGS. 2 to 4 divides the connecting shaft 9 into the left and right portions, both being rendered integrally rotatable and axially slidable by an angular shaft fitting through an intermediate shaft 91 of a small diameter. A spring 10 is accommodated in an intermediate shaft fitting port 93 of the left and right connecting shafts 9, 9.

A locking member 14 which is movable in the direction perpendicular to the intermediate shaft 91 running below the same is provided on a handle 611 extending from a link 61. A projection 141 is formed on the upper surface of the locking member 14 in correspondence to the inner end face of the connecting shaft 9. The projection 141 is normally at a position beneath the intermediate shaft 91 by the action of a return spring 13 provided between the locking member and the link 61. The position of the projection 141 is restricted by a stopper 142 formed at one end of the projection 141 to contact with the intermediate shaft 91. A reference numeral 27 designates a reciprocating guide rail for the locking member 14.

Accordingly, even when both ends of the connecting shaft 9, i.e., the left and right links 62, 62, are pushed inward, the inner end face of each of the left and right portions of the connecting shaft 9 butts against a side surface of the projection 141, being thus positively prevented from being shortened sufficiently to permit the pivot shaft 8 to be pulled out of the bearing 11.

When the locking member 14 is pushed frontward against the spring 13, the projection 141 escapes from below the intermediate shaft 91, whereby the connecting shaft 9 (left and right portion) can be pushed inward to the center part as shown by a dotted line in FIG. 4, and the pivot shaft 8 gets off the bearing 11.

The spring 10 which imparts a constantly expanding action to the abovementioned connecting shaft 9 to maintain fitting between the pivot shaft 8 and the bearing 11 may be provided on the connecting shaft 9 between the bearing 18 and the link 62. A reference numeral 15 designates a slip-preventive ring.

Figure 6:
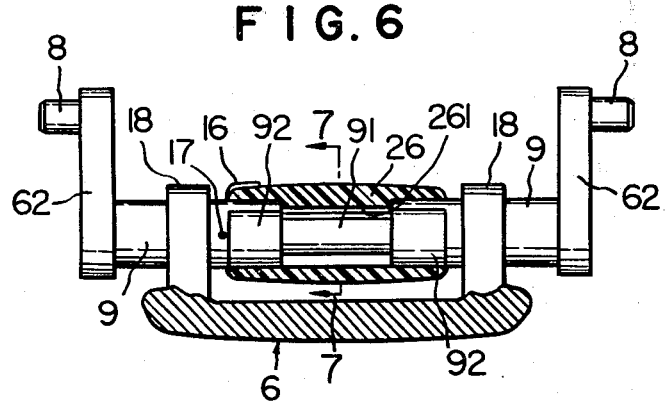
FIG. 6 is also a frontal view, partly cut away, of the toggle latch showing still another embodiment of the locking mechanism.

The locking member can also be provided rotatably around the connecting shaft 9 as shown in FIG. 6 et seq. In more detail, a freely rotatable sleeve 26 is fitted on the left and right portions of the connecting shaft 9 bridging the intermediate shaft 91, and a projection 261 provided on its inner peripheral surface prevents the connecting shaft 9 (left and right portions) from shortening by contacting with the inner end face of the connecting shaft 9.

Figure 7:
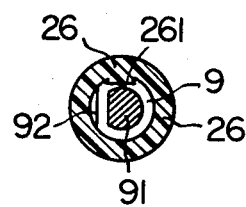
FIG. 7 is a cross-sectional view taking along a line 7—7 in FIG. 6.
Figure 9:
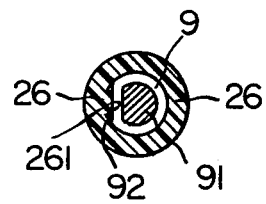
FIG. 9 is a cross-sectional view taken along a line 9—9 in FIG. 8.
Figure 8:
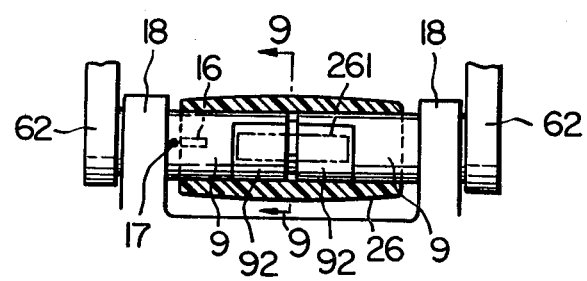
FIG. 8 is a frontal view, partly cut away, showing a contracted state of the connecting shaft.

When the sleeve 26 is rotated from its state as shown in FIGS. 6 and 7 to a position where indexes 16, 17 become coincident, the projection 261 arrives at a position of a chamfered portion 92 of the connecting shaft 9 as shown in FIG. 9, whereby the connecting shaft 9 can be shortened as shown in FIG. 8.

Since the latching device for the detachably attachable roof panel 3 according to the present invention is so constructed as mentioned above, the pivot shaft 8 between the toggle link 62 and the roof component 1 cannot be removed so far as the locking mechanism 14 (26) is not disengaged, hence there is no apprehension that the joint between the roof panel and the roof is unexpectedly disengaged.

Further, since the abovementioned operation should always be done with both hands, the support of the detachably attachable roof panel 3 becomes stable, whereby mounting and dismounting operations of the roof panel can be done without failure.

Figure 11:
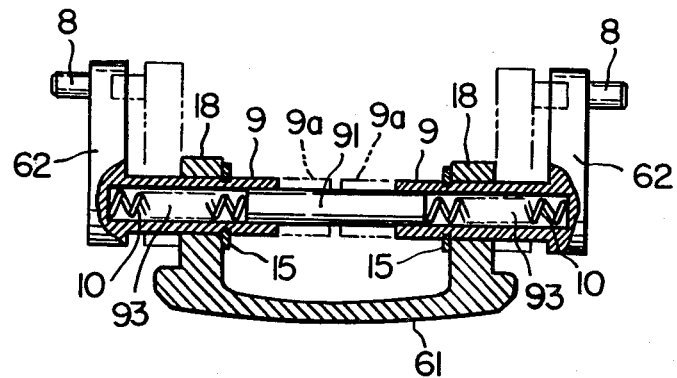
FIG. 11 is a frontal view, partly in cross-section, of the connecting shaft for the toggle latch.

In the following, another embodiment of the latching device according to the present invention will be explained in reference to FIGS. 10 and 11.

Same as mentioned in the foregoing, the connecting shaft 9 is divided into left and right portions, both being rendered integrally rotatable and axially slidable by an angular shaft fitting through the intermediate shaft 91 of a small diameter. A compression coil spring 10 is disposed in each of the intermediate shaft fitting port 93 for the left and right portions of the connecting shaft 9. By inwardly pushing both ends of the connecting shaft 9 against the spring 10, the connecting shaft 9 can be shortened to a position as shown by a chain line 9a as shown in FIG. 11, whereby the pivot shaft 8 gets off the bearing 11. A reference numeral 15 designates the slip-preventive ring which is in contact with the inside surface of the bearing 18 of the connecting shaft 9.

Figure 12:
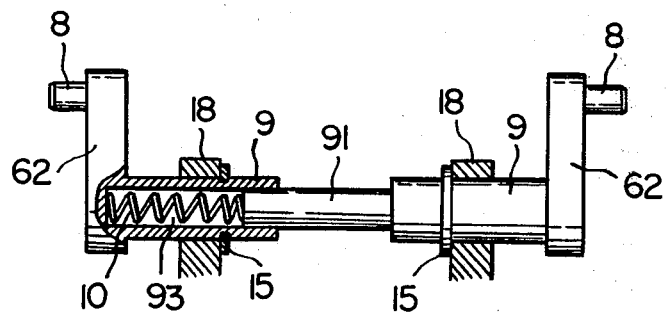
FIG. 12 is a frontal view, partly in cross-section, of a modification of the connecting shaft.

FIG. 12 shows another embodiment of the coil spring arrangement, wherein one end of the intermediate shaft 91 is fixedly secured to one of the left and right portions of the connecting shaft 9, while the other end of the intermediate shaft 91 is fitted into the intermediate shaft fitting port 93, into which port the compression coil spring 10 is inserted. This arrangement functions same as the embodiment shown in FIG. 11.

Figure 10:
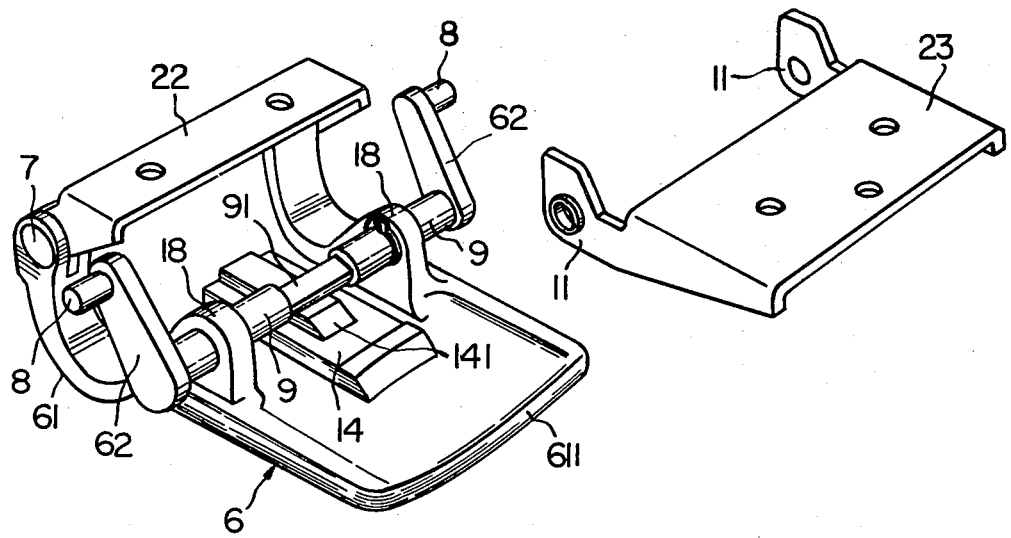
FIG. 10 is a perspective view of the toggle latch and its bearing member.

In FIG. 10, a numeral 14 refers to a locking mechanism to inhibit unexpected shortening of the connecting shaft 9. By pushing the same to escape, the abovementioned shortening operation becomes possible. A numeral 22 refers to a seating plate to mount the toggle latch 6 on the detachably attachable roof panel 3, which also serves as the bearing for the pivot shaft 7. A numeral 23 refers to a seating plate for mounting the bearing 10 of the other pivot shaft 8 on the roof component 1.

Since the latching device for the detachably attachable roof panel 3 according to the present invention is so constructed as mentioned above, the spring 10 to maintain the fitting state of the pivot shaft 8 to the bearing 10 of the roof 1 is out of external sight, which contributes to good appearance and aesthetic view of the product. In addition, since least damage is caused to the spring 10, the inherent defects in the conventional latching device can all be solved.

Figure 13:
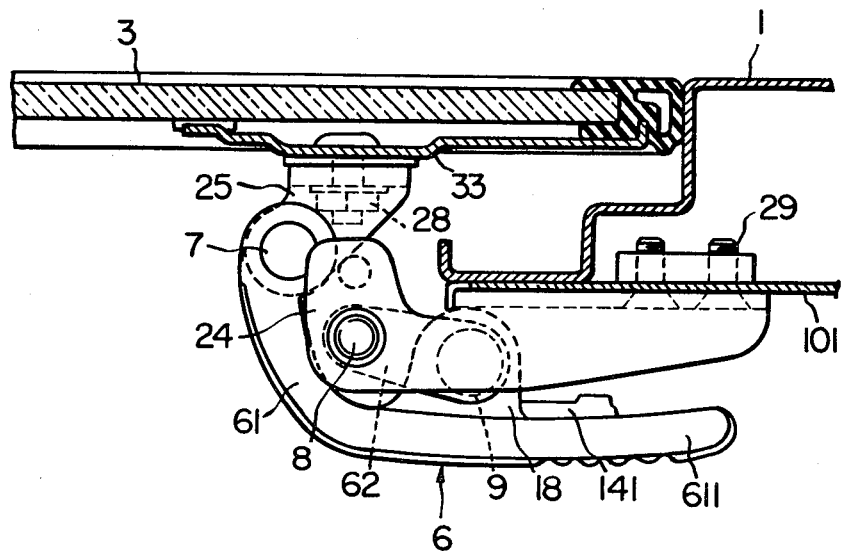
FIG. 13 is a side view showing a state of mounting the toggle latch.
Figure 14:
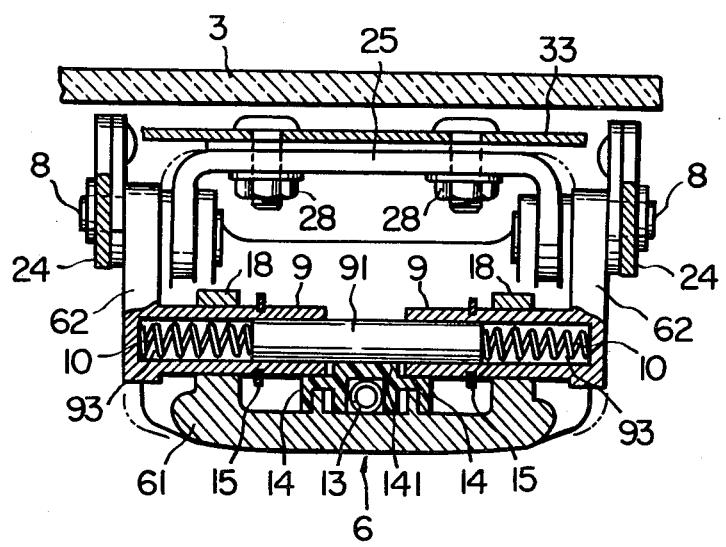
FIG. 14 is a frontal view, partly in cross-section, of the toggle latch according to the present invention.

In the following, other embodiment of the latching device according to the present invention will be described in reference to FIGS. 13 and 14.

Same as in the afore-described embodiments, the connecting shaft 9 is divided into left and right portions, both being rendered integrally rotatable and axially slidable by an angular shaft fitting through the intermediate shaft 91 of a small diameter. The spring 10 is also accommodated in the intermediate shaft fitting port 93.

The toggle latch 6 constituting the latching device of the present inventionl is mounted on a reinforcing frame 33 at the lower surface of the detachably attachable roof panel 3 with a screw 28 through a bearing 25 which has been previously assembled with the pivot shaft 7 of one of the links 61, while a bearing 24 at the side where the pivot shaft 8 of the other link 62 is supported is fixed on a ceiling member 101 with a screw 29.

However, when there exist fluctuations in the left and right directions of the vehicle body in setting the mounting position of, or assembling, the abovementioned toggle latch 6 and the bearing 24, the pivot shaft 8 of the link 62 cannot slip into the bearing 24 properly. In order therefore to solve this problem, the bearing 24 at the roof side is positioned and fixed by use of, for example, jig, etc.

In view of the abovementioned explanations, this particular embodiment of latching device of this invention makes it possible to readily absorb fluctuations in mounting the toggle latch 6 and the bearing 24 therefore without performing adjustment in the left and right directions of the respective fitting positions.

In other words, this embodiment has its characteristics in that the connecting shaft 9 integral with the link 62 which is to be pivotally fitted at the side of the roof 1 is movably supported in the axial direction with respect to the bearing section 24 on the link 61 to be pivotally fitted at the side of the roof panel 3.

A reference numeral 15 designates the slip-preventive ring fitted on the outer peripheral surface of the connecting shaft 9. In the state of the pivotal shaft 8 being fitted in the bearing 24, there exists a gap or clearance between the bearing part 18 and the slip-preventive ring 15 as well as between the link 62 and the bearing part 18. The clearance between the bearing part 18 and the link 62 constitutes an allowance for shortening the connecting shaft 9 when the pivotal shaft 8 is pulled out of the bearing 24.

Since the latching device for the detachably attachable roof panel 3 according to the present invention is so constructed as mentioned above, the pivotal shaft 8 can be readily and accurately fitted on the bearing 24 by properly moving the link 62 and the connecting shaft 9 in the axial direction, even when the fitting position of the toggle latch 6 to the detachably attachable roof panel 3 and the mounting position of the bearing 24 to the roof 1 slightly deviates to either left or right side. In other words, the toggle latch 6 per se has an absorbing function of the fluctuations in its assemblage, which provides an effect of facilitating the assembling work of the latch for the detachably attachable roof panel.

What is claimed is:

1. In a latching device for a detachably attachable type roof panel in a vehicle, comprising:
   (a) a roof of the vehicle having an opening formed in one part thereof, said opening having an inner peripheral brim;
   (b) a roof panel of a size to be snugly fitted in said opening of said roof in a detachably attachable manner;
   (c) a detachably attachable hinge member provided on the front edge of said roof panel and which is engaged with the inner peripheral brim of said roof opening;
   (d) a toggle latch provided on the rear edge of said roof panel to be also engaged with said inner peripheral brim of said roof opening, said toggle latch having link members; and
   (e) a pivotal shaft for connecting one of said link members of said toggle latch and said roof being inserted and withdrawn by the expanding and contracting operations of a connecting shaft for the link members through said link members, and said pivotal shaft being maintained in its fitted state by a spring provided on the connecting shaft, the improvement comprising:
   a locking mechanism which positively prevents contraction to a release position of said expanding and contracting connecting shaft in one position of said locking mechanism and means for permitting moving said locking mechanism to a position at which it does not prevent contraction of said connecting shaft when said roof panel is to be removed from said roof opening, said locking mechanism being provided on said toggle latch.

2. The latching device as set forth in claim 1, wherein a spring to retain the fitted state of said pivotal shaft is incorporated in said expanding and contracting shaft.

3. The latching device as set forth in claim 1, wherein the connecting shaft integral with the links to be pivotally fitted at said roof side is movably supported in the axial direction with respect to a bearing part on said link to be pivotally fitted to the side of said detachably attachable roof panel.

4. The improvement of claim 1 wherein the connecting shaft includes two ends having radial faces facing one another, and said locking mechanism includes a projection with side surfaces adjacent said radial faces and adapted to be engaged by said radial faces when said projection lies between them in said one position.

5. The improvement of claim 4 wherein said ends are cylinders with opened ends facing one another, slidably mounted on an intermediate shaft, and compression springs are seated within the said cylindrical ends, bearing against ends of said intermediate shaft to bias said cylindrical ends outwardly.

* * * * *